United States Patent
Seo

(10) Patent No.: US 9,479,704 B2
(45) Date of Patent: Oct. 25, 2016

(54) APPARATUS AND METHOD FOR SUPPORTING ZOOM MICROPHONE FUNCTIONAL IN MOBILE TERMINAL

(71) Applicant: Samsung Electronics Co., Ltd., Suwon-si (KR)

(72) Inventor: Seok-Weon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/739,882

(22) Filed: Jun. 15, 2015

(65) Prior Publication Data
US 2015/0281589 A1 Oct. 1, 2015

Related U.S. Application Data

(63) Continuation of application No. 14/307,361, filed on Jun. 17, 2014, now Pat. No. 9,060,133, which is a continuation of application No. 13/039,077, filed on Mar. 2, 2011, now Pat. No. 8,754,962.

(30) Foreign Application Priority Data

Mar. 2, 2010 (KR) .................. 10-2010-0018393

(51) Int. Cl.
| | |
|---|---|
| H04N 5/262 | (2006.01) |
| H04N 5/232 | (2006.01) |
| H04N 7/14 | (2006.01) |
| H04R 1/08 | (2006.01) |

(52) U.S. Cl.
CPC .......... *H04N 5/23296* (2013.01); *H04N 5/262* (2013.01); *H04N 7/141* (2013.01); *H04R 1/08* (2013.01)

(58) Field of Classification Search
CPC ............... H05N 5/2628; H05N 5/262; H05N 5/23296; H05N 5/232; H05N 21/42203; H05N 7/141
USPC ........ 348/222.1, 240.99, 240.3, 211.1, 211.9
See application file for complete search history.

(56) References Cited

U.S. PATENT DOCUMENTS

| | | | | |
|---|---|---|---|---|
| 4,984,087 A | * | 1/1991 | Fujimura | H04N 5/232 348/222.1 |
| 2001/0024233 A1 | * | 9/2001 | Urisaka | H04N 5/232 348/211.6 |
| 2002/0080241 A1 | * | 6/2002 | Paritsky | H04N 5/232 348/207.99 |
| 2005/0099511 A1 | * | 5/2005 | Cazier | H03G 3/30 348/231.4 |
| 2006/0210257 A1 | | 9/2006 | Yoon | |
| 2007/0120986 A1 | * | 5/2007 | Nunomaki | G11B 27/034 348/222.1 |
| 2009/0303350 A1 | * | 12/2009 | Terada | 348/231.4 |

FOREIGN PATENT DOCUMENTS

| | | |
|---|---|---|
| JP | H06-292056 | 10/1994 |
| KR | 10-2006-0019412 | 3/2006 |
| KR | 10-2006-0101635 | 9/2006 |

OTHER PUBLICATIONS

English Translation and Preliminary Rejection Report issued for KR 10-2010-0018393 dated Dec. 22, 2015, 8 pgs.

* cited by examiner

*Primary Examiner* — Yogesh Aggarwal

(57) ABSTRACT

A method and apparatus support a zoom microphone function in mobile terminal. The apparatus includes a plurality of microphones, a camera, and a controller. Each of the plurality of microphones has a different directional characteristic. The camera captures an image. And the controller determines a zoom level of the camera, and adjusts gains of the plurality of microphones based on a zoom range to which the zoom level belongs.

20 Claims, 5 Drawing Sheets

APPARATUS AND METHOD FOR SUPPORTING ZOOM MICROPHONE FUNCTIONAL IN MOBILE TERMINAL

CROSS-REFERENCE TO RELATED APPLICATION(S) AND CLAIM OF PRIORITY

The present application is a continuation of U.S. patent application Ser. No. 14/307,361 filed on Jun. 17, 2014 (now U.S. Pat. No. 9,060,133), which is a continuation of U.S. patent application Ser. No. 13/039,077 filed on Mar. 2, 2011 (now U.S. Pat. No. 8,754,962), which claims the benefit under 35 U.S.C. §119(a) to a Korean patent application filed in the Korean Intellectual Property Office on Mar. 2, 2010 and assigned Serial No. 10-2010-0018393, the entire disclosures of which are hereby incorporated by reference.

TECHNICAL FIELD OF THE INVENTION

The present invention relates to a mobile terminal. More particularly, the present invention relates to an apparatus and a method for supporting a zoom microphone function in a mobile terminal.

BACKGROUND OF THE INVENTION

In modern society, mobile terminals are rapidly distributed due to their convenience and necessity. Therefore, service providers and terminal manufacturers provide additional functions in order to further raise utility of the mobile terminal. Recently, as a hardware performance of a mobile terminal and a utility efficiency of a wireless channel are improved, a video telephone function that enables communication with a counterpart user using both a video and a sound is supported. To provide a more efficient video communication service to a user, a function for zooming in/zooming out a camera based on a distance between the camera provided to the mobile terminal and the user may be supported.

As a distance between the camera and the object increases, even when the user zooms in the camera, a mic input gain does not change. In other words, as the distance to the camera increases, a distance between the mobile terminal and a sound source increases, but a user needs to manually adjust a mic input volume in order to compensate for the reduction in the mic input volume caused by the increased distance. However, when the user increases the mic input gain in order to simply receive a voice generated from a far away sound source at a desired volume, neighbor noises increase together. Accordingly, a Signal-to-Noise Ratio (SNR) does not change or even reduce, such that performance deterioration may be caused.

As described above, when a mobile terminal provides a video communication function, as a distance between a user and a microphone of the mobile terminal changes, a size of a sound input to the microphone changes. Therefore, an alternative for improving quality of video communication by minimizing an influence of a noise and increasing an input gain for a voice needs to be provided.

SUMMARY OF THE INVENTION

To address the above-discussed deficiencies of the prior art, it is a primary aspect of the present invention to provide an apparatus and a method for improving a video communication quality in a mobile terminal.

Another aspect of the present invention is to provide an apparatus and a method for adaptively increasing an input gain for a voice in a mobile terminal.

Another aspect of the present invention is to provide an apparatus and a method for adjusting an input volume of a microphone depending on zoom-in/zoom-out of a camera in a mobile terminal.

Yet another aspect of the present invention is to provide an apparatus and a method for adjusting a directional characteristic of a microphone based on the zoom-in/zoom-out control of a camera in a mobile terminal.

According to an aspect of the present invention, an apparatus of a mobile terminal is provided. The apparatus includes a plurality of microphones, each microphone comprising a different directional characteristic. A camera captures an image. And a controller determines a zoom level of the camera, and adjusts gains of the plurality of microphones based on a zoom range to which the zoom level belongs.

According to another aspect of the present invention, a method for operating a mobile terminal with a camera and a plurality of microphones, each microphone comprising a different directional characteristic, is provided. The method includes determining a zoom level of the camera. Gains of the plurality of microphones are adjusted based on a zoom range to which the zoom level belongs.

According to yet another aspect of the present invention, a mobile terminal is provided. The mobile terminal includes a plurality of microphones, a camera, and a controller. Each microphone comprises a distinct directional characteristic. The camera captures images. And the controller adjusts a gain for each microphone based on a zoom level of the camera.

Other aspects, advantages and salient features of the invention will become apparent to those skilled in the art from the following detailed description which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1A through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Embodiments of the present invention provide a technology for adjusting an input sound volume of a microphone depending on zoom-in/zoom-out of a camera in a mobile terminal.

A mobile terminal according to an embodiment of the present invention has a plurality of microphones with a different directional characteristic and adjusts a gain of each microphone based on a zoom state of a camera. For example, the plurality of microphones may have directional characteristics as shown in FIGS. 1A to 1C.

Figure 1A:
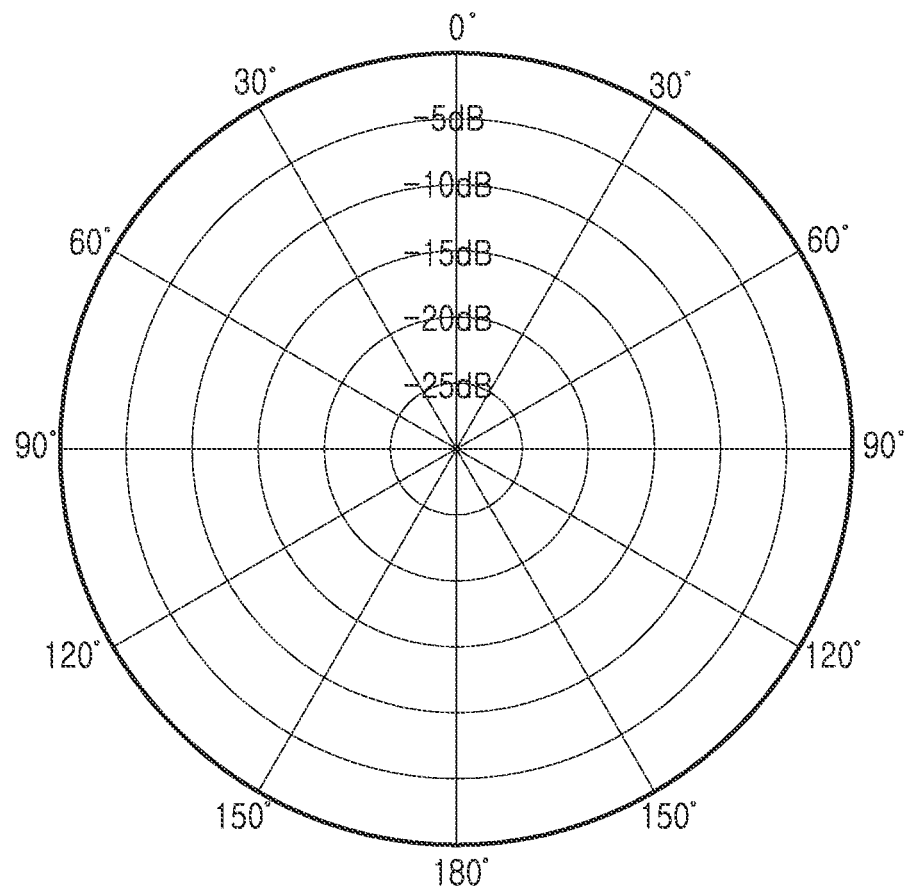
FIGS. 1A to 1C illustrate directional characteristics of microphones provided to a mobile terminal according to an embodiment of the present invention.
Figure 1B:
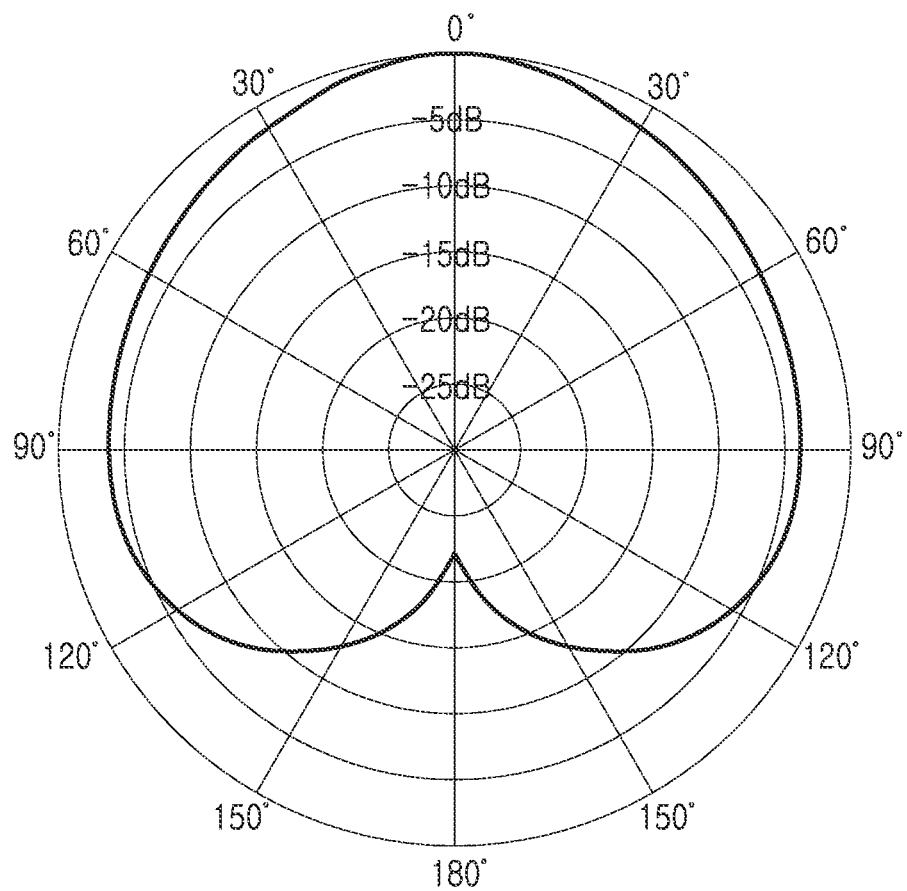
Figure 1C:
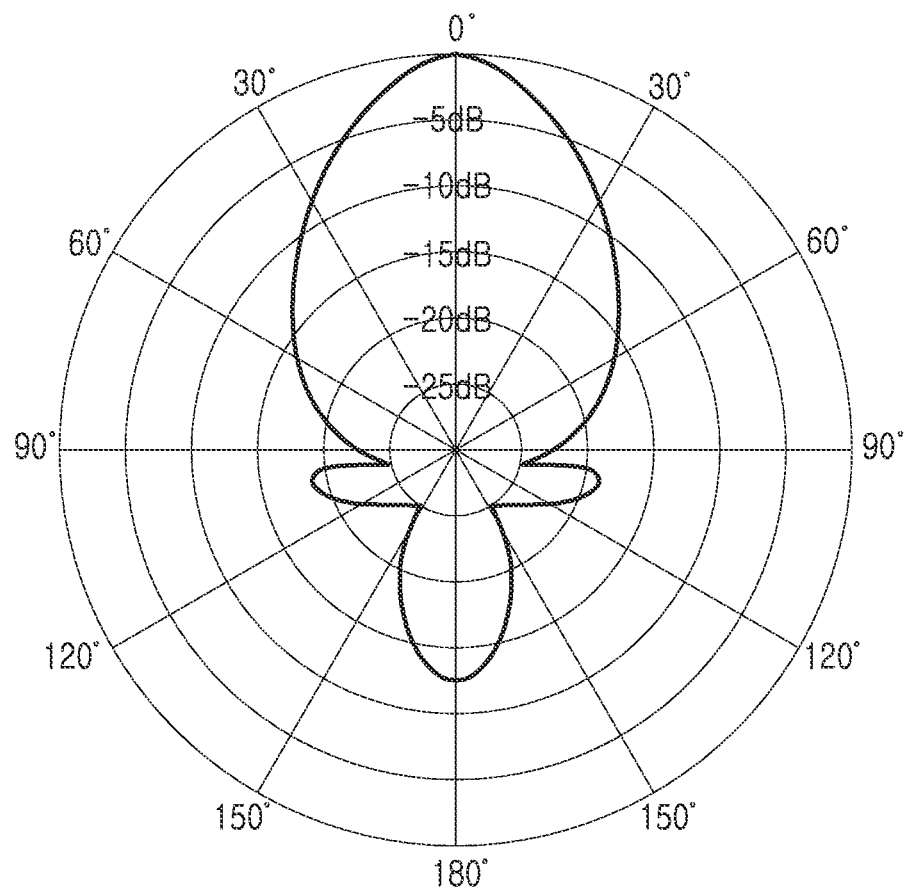

FIGS. 1A to 1C illustrate directional characteristics of microphones provided to a mobile terminal according to an embodiment of the present invention.

FIG. 1A illustrates the sensitivity and radius of a microphone with no directivity. As illustrated in FIG. 1A, the microphone with no directivity has a characteristic of reacting with the same sensitivity to sounds coming from all angles. The microphone with no directivity reacts in the same manner to a sound coming from all directions, that is, a direction ranging from 0 degree to 180 degree.

FIG. 1B illustrates the sensitivity and radius of a microphone with uni-directivity. As illustrated in FIG. 1B, the microphone with uni-directivity sensitively reacts only to sounds that come from a specific range of direction. For example, the microphone reacts only to sounds from a directions facing forward (i.e., from the 0 degree direction) and both sides (i.e., from both 90 degree directions) and is insensitive to sounds from the rear side (i.e., from the 180 degree direction.

FIG. 1C illustrates the sensitivity and radius of a microphone with ultra directivity. As illustrated in FIG. 1C, the microphone with ultra directivity sensitively reacts only to sounds from a narrow angle within the front 30 degree directions and is nearly does not react to a sound from other angles.

A mobile terminal according to an embodiment of the present invention includes the above-described microphones different directivities, and adjusts the gain of each microphone depending on a zoom state of a camera. At this point, the zoom state of the camera is considered because a distance to an object (i.e., a sound source) may be estimated from the zoom state of the camera. That is, because zoom-in is used when an object is located far away, when the camera is zoomed-in, it is estimated that the sound source is located far away. In addition, because zoom-out is used when an object is located nearby, when the camera is zoomed-out, it is estimated that the sound source is located nearby. Therefore, when a range from a maximum zoom-in to a maximum zoom-out is divided into 10 levels with level 1 corresponding to the maximum zoom-in and level 10 corresponding to the maximum zoom-out, the gain of a microphone with ultra directivity is set highest for levels 1 to 3 close to the zoom-in, the gain of a microphone with uni-directivity is set highest for levels 4 to 7, and the gain of a microphone with no directivity is set highest for levels 8 to 10. It is preferable that an accurate value of the gain for each microphone is determined according to a specific embodiment and the intent of an operator who carries out the present invention.

Hereinafter, the construction and operation of a mobile terminal for adjusting an input volume of a microphone is described in more detail with reference to the drawings.

Figure 2:
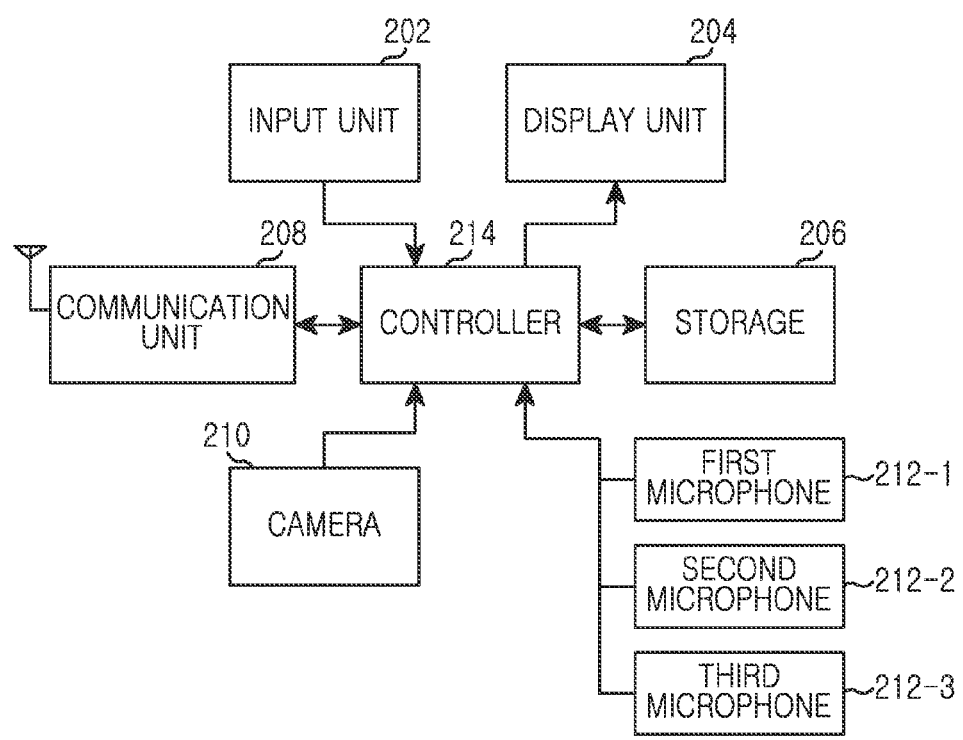
FIG. 2 illustrates a block diagram of a mobile terminal according to an embodiment of the present invention.

FIG. 2 illustrates a block diagram of a mobile terminal according to an embodiment of the present invention.

As illustrated in FIG. 2, the mobile terminal includes an input unit 202, a display unit 204, a storage 206, a communication unit 208, a camera 210, a first microphone 212-1, a second microphone 212-2, a third microphone 212-3, and a controller 214.

The input unit 202 recognizes an input generated by a user, and provides information corresponding to the input to the controller 214. For example, the input unit 202 processes the user's input through a keyboard, a keypad, a touch screen, a touch pad, a mouse, a special function button, and such.

The display unit 204 displays status information occurring during an operation of the terminal (using numbers, letters, and images) while an application is executed. That is, the display unit 204 displays image data provided from the controller 214 through a visual screen. For example, the display unit 214 may be a Liquid Crystal Display (LCD), an Organic Light-Emitting Diode (OLED), and such.

The storage 206 stores a basic program for operating the mobile terminal, contents data, an application, and such, and provides stored data to the controller 214 in response to a request from the controller 214. For example, the application includes an application for video communication.

The communication unit 208 provides an interface for transmission/reception of a signal via a radio channel. That is, the communication unit 208 converts transmission data into a Radio Frequency (RF) signal to transmit the RF signal via an antenna, and converts an RF signal received via the antenna into reception data. At this point, the communication unit 208 performs conversion between data and an RF signal according to a standard of a communication system.

The camera 210 serves as a block for image input, and converts an image cast on a lens into image data. At this point, the camera 210 has a zoom-in/zoom-out function. The zoom-in/zoom-out function may be realized by digital image processing or physical movement of a lens. The operation of the zoom-in/zoom-out function is performed under control of the controller 214.

The first microphone 212-1, the second microphone 212-2, and the third microphone 212-3 serve as blocks for sound input, and convert a sound signal input from an external sound source into an electrical signal. Here, the first microphone 212-1, the second microphone 212-2, and the third microphone 212-3 have a different directional characteristic. For example, the first microphone 212-1 may be the microphone with no directivity as illustrated in FIG. 1A, the second microphone 212-2 may be the microphone with uni-directivity as illustrated in FIG. 1B, and the third microphone 212-3 may be the microphone with ultra directivity as illustrated in FIG. 1C. At this point, the gains of the first microphone 212-1, the second microphone 212-2, and the third microphone 212-3 may be adjusted individually, and the adjustment of the gain is performed under control of the controller 214. The illustration of the three microphones of the first microphone 212-1, the second microphone 212-2, and the third microphone 212-3 in FIG. 2 represents only one embodiment, as two or four or more microphones may be provided according to other embodiments of the present invention.

The controller 214 controls an overall operation of the mobile terminal. For example, the controller 211 processes a user's key input, and such, through the input unit 202, and provides image data to the display unit 204. In addition, the controller 214 stores or reproduces image data provided from the camera 210, and controls the zoom-in/zoom-out of the camera 210. For example, the controller 210 determines a zoom level of the camera 210 based on the user's input via the input unit 202 or a distance to an object that is being captured by the camera 210. In addition, the controller 214 stores or reproduces sound data from the first microphone 212-1, the second microphone 212-2, and the third microphone 212-3, and adjusts the gains of the first microphone 212-1, the second microphone 212-2, and the third microphone 212-3. In addition, the controller 214 generates and analyzes communication packets transmitted/received via the communication unit 208.

According to an embodiment of the present invention, the controller 214 adjusts the gains of the first microphone 212-1, the second microphone 212-2, and the third microphone 212-3 based on the zoom level of the camera 210 while performing a video communication function. Here, the zoom level of the camera 210 is divided into N levels ranging from a maximum zoom-in level to a maximum zoom-out level. The N levels are grouped into three ranges, which are the number of the plurality of microphones 212-1 to 212-3. Each of the three ranges includes one zoom level or a plurality of successive zoom levels. At this point, the three ranges correspond to the plurality of microphones 212-1 to 212-3, respectively. A range close to the range including the maximum zoom-in level corresponds to a microphone with a high directional characteristic. Accordingly, the controller 211 adjusts the gains such that the gain of a microphone corresponding to a current range becomes a maximum among the gains of the plurality of microphones. For example, when dividing the zoom level into ten levels, the controller 214 sets the gain of the third microphone 212-3 highest, which is a microphone with ultra directivity, for levels 1 to 3 close to the zoom-in, sets the gain of the second microphone 212-2 highest, which is a microphone with uni-directivity, for levels 4 to 7, and set the gain of the first microphone 212-1 highest, which is a microphone with no directivity, for levels 8 to 10.

In the construction of the mobile terminal described with reference to FIG. 2 according to an embodiment of the present invention, gain adjustment of the microphones depending on the zoom level of the camera is performed when video communication is performed. However, gain adjustment of the microphones depending on the zoom level of the camera may be performed while a function of simultaneously receiving video and sound as well as the video communication is performed. For example, even during moving image capturing, gain adjustment of the microphones depending on the zoom level of the camera may be performed.

Figure 3:
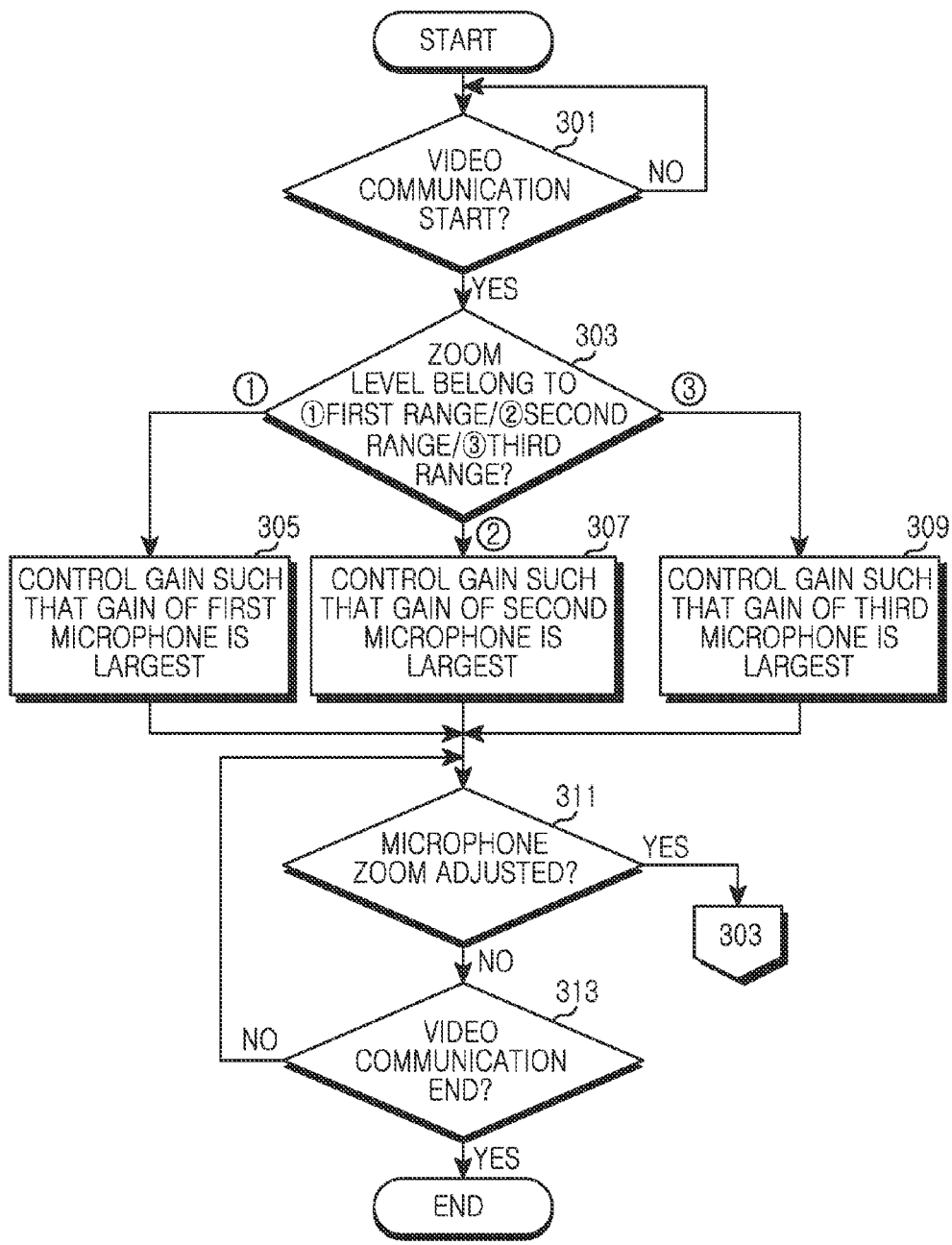
FIG. 3 illustrates a process of a mobile terminal according to an embodiment of the present invention.

FIG. 3 illustrates a process of a mobile terminal according to an embodiment of the present invention.

Referring to FIG. 3, the mobile terminal determines whether video communication has started in block 301.

When video communication starts, the mobile terminal determines whether a current zoom level of a camera belongs to a first range, a second range, or a third range in block 303. Each of the three ranges includes one zoom level or a plurality of successive zoom levels. The zoom levels are divided into N levels ranging from a maximum zoom-in level to a maximum zoom-out level. However, according to an embodiment of the present invention, the zoom levels may be grouped into two or four or more ranges.

When the zoom level corresponds to the first range, the mobile terminal proceeds to block 305 to adjust a gain for each microphone such that the gain of the first microphone is largest. When the zoom level corresponds to the second range, the mobile terminal proceeds to block 307 to adjust a gain for each microphone such that the gain of the second microphone is largest. When the zoom level corresponds to the third range, the mobile terminal proceeds to block 309 to adjust a gain for each microphone such that the gain of the third microphone is largest. That is, the first range to the third range correspond, respectively, to microphones with different directional characteristics provided to the mobile terminal. Therefore, the mobile terminal adjusts a gain for each microphone such that the gain of a microphone corresponding to a range to which a current zoom level belongs becomes maximized.

The mobile terminal determines whether the zoom level of the camera is adjusted in block 311. For example, the zoom level is determined based on a user's manipulation or a distance to an object that is being captured by the camera. In other words, the mobile terminal determines whether the zoom level changes. When the zoom level is adjusted, the mobile terminal returns to block 303 to determine a range to which the zoom level after the adjustment belongs.

In contrast, when the zoom level is not adjusted, the mobile terminal determines whether video communication has ended in block 313. When the video communication has not ended, the mobile terminal returns to block 311. When the video communication is ended, the mobile terminal ends the present procedure.

In the operation of the mobile terminal described with reference to FIG. 3 according to an embodiment of the present invention, gain adjustment of the microphones based on the zoom level of the camera is performed when video communication is performed. However, gain adjustment of the microphones based on the zoom level of the camera may be performed while a function of simultaneously receiving video and sound as well as the video communication is performed. For example, even during moving image capturing, gain adjustment of the microphones based on the zoom level of the camera may be performed.

Because the mobile terminal can adjust voice volume based on whether an object is far away or close through synchronization with a camera lens zoom-in/zoom-out using a zoom microphone function during video communication, a realistic voice can be received and an SNR improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal comprising:
   a plurality of microphones, each microphone having a different directional characteristic;
   a camera; and
   a controller configured to:
      initiate a capture of a video; and
      adjust gains of the plurality of microphones such that a gain of a first microphone of the plurality of microphones is increased in response to the camera zooming-in, and a gain of a second microphone of the plurality of microphones is increased in response to the camera zooming-out, during the capture of the video.

2. The mobile terminal of claim 1, wherein the plurality of microphones comprises:
   a third microphone having no directivity and that is configured to react to sounds from all directions at a same sensitivity;
   the first microphone having a ultra-directivity and that is configured to react only to a sound from a narrow direction in a range of 30 degrees at a sensitivity of a second threshold or more; and
   the second microphone having a uni-directivity and that is configured to react only to a sound from a direction in a range of 180 degrees at a sensitivity of a first threshold or more.

3. The mobile terminal of claim 2, wherein zoom levels of the camera are divided into N levels ranging from a maximum zoom-in level to a maximum zoom-out level, the N levels are divided into M zoom ranges, and each of the M zoom ranges comprises one zoom level or a plurality of successive zoom levels.

4. The mobile terminal of claim 3, wherein each of the M zoom ranges corresponds to one of the plurality of microphones.

5. The mobile terminal of claim 4, wherein the controller is configured to activate a function of adjusting the gains of the microphones while the capture of the video is performed.

6. The mobile terminal of claim 4, wherein the controller is configured to determine a zoom level of the camera based on a user's manipulation.

7. The mobile terminal of claim 4, wherein the controller is configured to determine a zoom level of the camera based on a distance to an object that is being captured by the camera.

8. A method for operating a mobile terminal comprising a camera and a plurality of microphones each having a different directional characteristic, the method comprising:
   initiating a capture of a video; and
   adjusting gains of the plurality of microphones such that a gain of a first microphone of the plurality of microphones is increased in response to the camera zooming-in, and a gain of a second microphone a plurality of microphones is increased in response to the camera zooming-out, during the capture of the video.

9. The method of claim 8, wherein the plurality of microphones comprises:
   a third microphone having no directivity and that is configured to react to sounds from all directions at a same sensitivity;
   the first microphone having a ultra-directivity and that is configured to react only to a sound from a narrow direction in a range of 30 degrees at a sensitivity of a second threshold or more; and
   the second microphone having a uni-directivity and that is configured to react only to a sound from a direction in a range of 180 degrees at a sensitivity of a first threshold or more.

10. The method of claim 9, wherein zoom levels of the camera are divided into N levels ranging from a maximum zoom-in level to a maximum zoom-out level, the N levels are divided into M zoom ranges, and each of the M zoom ranges comprises one zoom level or a plurality of successive zoom levels.

11. The method of claim 10, wherein each of the M zoom ranges corresponds to one of the plurality of microphones.

12. The method of claim 11, further comprising adjusting the gains of the plurality of microphones while the capture of the video is performed.

13. The method of claim 11, wherein a current zoom level of the camera is determined based on a user's manipulation.

14. The method of claim 11, wherein a current zoom level of the camera is determined based on a distance to an object that is being captured by the camera.

15. An apparatus for use in a mobile terminal having a camera, the apparatus comprising:
   a plurality of microphones each having a different directional characteristic; and
   a controller configured to:
      initiate a capture of a video; and
      adjust gains of the plurality of microphones such that a gain of a first microphone of the plurality of microphones is increased in response to the camera zooming-in, and a gain of a second microphone of the plurality of microphones is increased in response to the camera zooming-out, during the video.

16. The apparatus of claim 15, wherein the plurality of microphones comprises:
   a third microphone having no directivity and that is configured to react to sounds from all directions at a same sensitivity;
   the first microphone having a ultra-directivity and that is configured to react only to a sound from a narrow direction in a range of 30 degrees at a sensitivity of a second threshold or more; and
   the second microphone having a uni-directivity and that is configured to react only to a sound from a direction in a range of 180 degrees at a sensitivity of a first threshold or more.

17. The apparatus of claim 16, wherein zoom levels of the camera are divided into N levels ranging from a maximum zoom-in level to a maximum zoom-out level, the N levels are divided into M zoom ranges, and each of the M zoom ranges comprises one zoom level or a plurality of successive zoom levels.

18. The apparatus of claim 17, wherein each of the M zoom ranges corresponds to one of the plurality of microphones.

19. The apparatus of claim 18, wherein the controller is configured to activate a function of adjusting the gains of the microphones while the capture of the video is performed.

20. The apparatus of claim 18, wherein the controller is configured to determine a zoom level of the camera based on a user's manipulation.

* * * * *